United States Patent
Ota et al.

[11] Patent Number: 6,111,328
[45] Date of Patent: Aug. 29, 2000

[54] SWITCHING ASSEMBLY

[75] Inventors: Munenori Ota; Masanori Sugiyama, both of Aichi-ken, Japan

[73] Assignee: Aisin Seiki Kabushiki Kaisha, Kariya, Japan

[21] Appl. No.: 09/138,326

[22] Filed: Aug. 24, 1998

[30] Foreign Application Priority Data

Aug. 22, 1997 [JP] Japan .................................. 09-226473

[51] Int. Cl.[7] .................................................. H01B 7/30
[52] U.S. Cl. ............................................ 307/147; 307/125
[58] Field of Search ..................................... 307/125, 145, 307/147, 149, 150; 361/826, 829; 318/701; 363/144, 145

[56] References Cited

U.S. PATENT DOCUMENTS 5,247,419  9/1993  Grundmann ............................. 361/94
5,619,108  4/1997  Komurasaki et al. ................... 318/140
5,694,030  12/1997  Sato et al. ............................. 323/282

FOREIGN PATENT DOCUMENTS 63-224692  9/1988  Japan .

*Primary Examiner*—Jeffrey Gaffin
*Assistant Examiner*—Peter Zura
*Attorney, Agent, or Firm*—Sughrue, Mion, Zinn, Macpeak & Seas, PLLC

[57] ABSTRACT

Three switching units and three smoothing capacitors are disposed in parallel with each other in the x-direction on a substrate having an x-y plane. A surface conductor and a rear conductor, which include bases extending in the x-direction and three branches extending in the y-direction therefrom, are laminated to form a feeding bus bar 8 for connecting the respective units and the respective capacitors. The three branches have the same pattern and are distributed in the x-direction at the same pitch as the x-direction arrangement of the units 2–4. The connection patterns of the respective units and the respective branches are the same for the three pairs.

6 Claims, 3 Drawing Sheets

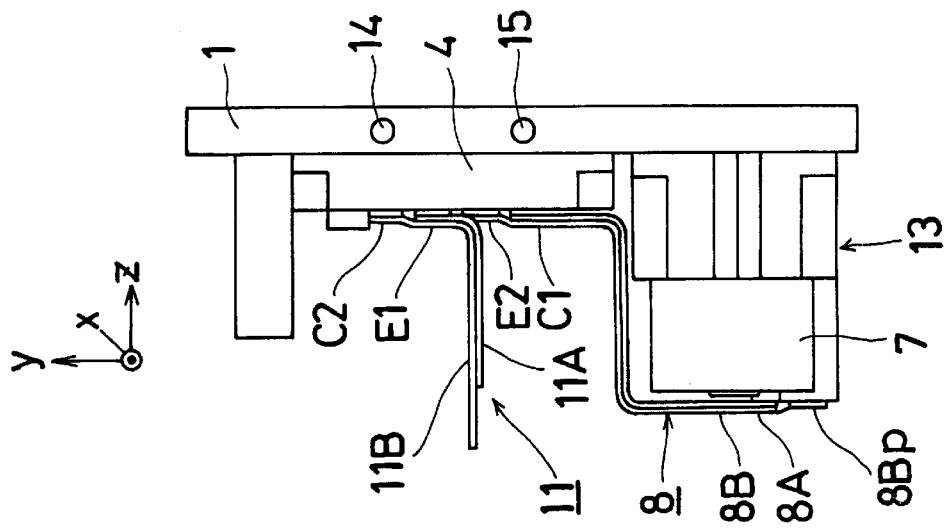
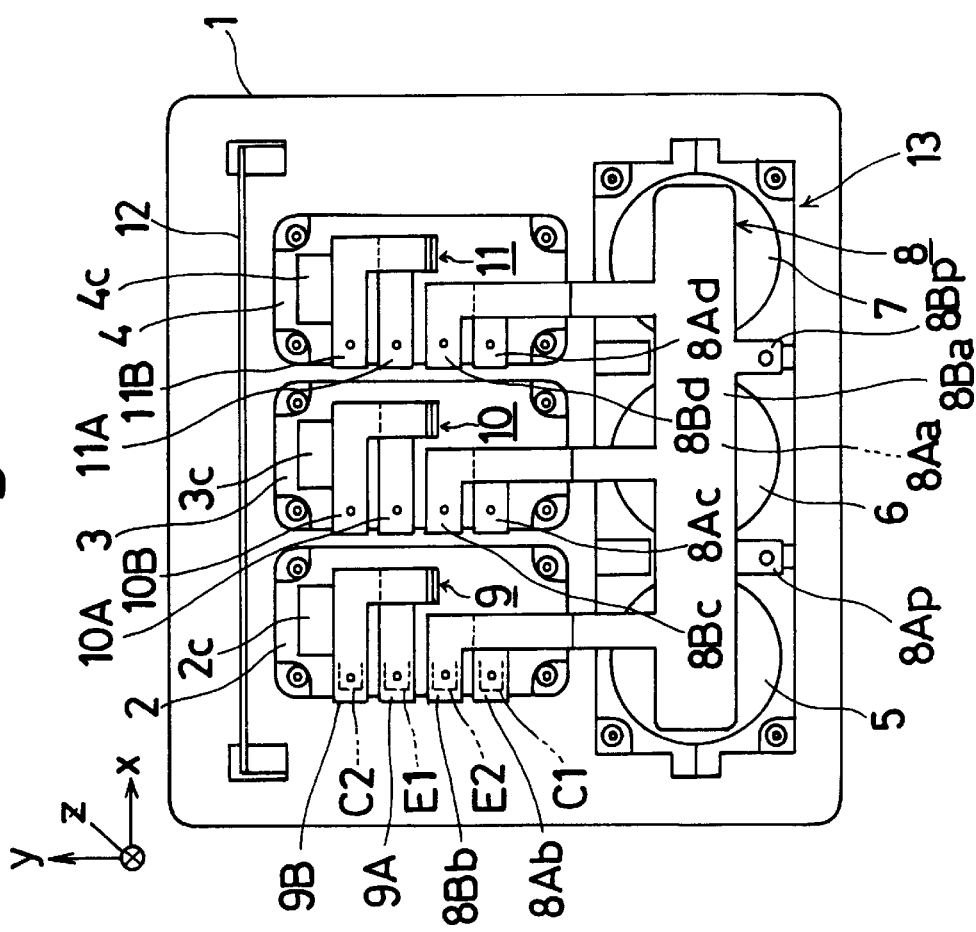

SWITCHING ASSEMBLY

BACKGROUND OF THE INVENTION

1. Field of the Invention

The present invention relates to an assembly comprised of a plurality of switching circuits each of which controls the flow of current to an electric coil, and more particularly to a three-phase inverter for feeding current to a three-phase switched reluctance motor (SR motor) though the present invention is not limited thereto.

2. Description of the Related Art

The SR motor generally includes a rotor formed in such a manner that a polar portion protrudes outwardly from a core and a stator formed in such a manner that a polar portion protrudes inwardly from a core. The rotor is comprised of an iron core formed by merely laminating iron plates, and the stator includes an electric coil concentrically wound around each pole. The respective poles of the stator operate as electromagnets and the magnetic force of the stator attracts the respective polar portions of the rotor so that the rotor is rotated. Thus, when the current feeding state of the electric coil wound around the respective poles of the stator is sequentially changed according to the rotation position of the respective poles of the rotor, the rotor can be rotated in a desired direction. Japanese Patent Unexamined Publication No. Hei. 7-274569 discloses a feed control device for controlling rotation torque in such a manner that each electric coil is connected to a switching circuit IGBT for each phase feeding in a three-phase inverter, each switching circuit IGBT is sequentially turned on to rotate an SR motor and a feed current value of each phase is adjusted by duty control of PWN.

The three-phase inverter for the SR motor is constituted by smoothing capacitors connected to a power source in parallel and three switching circuits connected to the capacitors in parallel. Each of the switching circuits is constituted by two switching transistors IGBT and two diodes connected to each end of the electric coil. When current is supplied to the motor coil of each phase, current flows from the smoothing capacitor through a bus bar and the switching circuit.

Thus, variation of voltage occurs in the switching circuit under the influence of intrinsic inductance of the bus bar and feeding in the phase to be fed and in the other phases so that a spike voltage is generated. In order to suppress this, it has been necessary to provide a snubber circuit for absorbing the spike voltage, and the capacitance of a capacitor for absorbing the spike voltage must be increased.

SUMMARY OF THE INVENTION

A first object of the present invention is to decrease the occurrence of a spike voltage, a second object thereof is to make a snubber circuit unnecessary or of small capacitance, and third object thereof is to increase the operation stability of a three-phase inverter for an SR motor.

In order to achieve the above objects, according to a first aspect of the present invention, a switching assembly comprises smoothing capacitors (5–7) connected to a power source in parallel, a plurality of switching circuits (2–4) respectively feeding current to each of a plurality of electric coils (Ph1–Ph3), and a feeding conductor (8) connected to the smoothing capacitors and including a plurality of branch conductors (8Ab–8Ad/8Bb–8Bd) respectively connected to each of the switching circuits (2–4) and having substantially the same wiring shape and wiring length relative to each other. According to this, the values of inductance of the feeding conductor (8) from the smoothing capacitors (5–7) to the respective switching circuits (2–4) become substantially the same or very approximate to each other and the spike voltage due to unbalance of the inductance of the feeding conductors of the respective switching circuits (2–4) is lowered. The snubber circuit becomes unnecessary or its capacity becomes small. In the case of a three-phase inverter for an SR motor, the operation stability becomes high.

According to a second aspect of the present invention, the switching circuits (2–4) are distributed with an equal pitch in an x-direction and the branch conductors (8Ab–8Ad/ 8Bb–8Bd) are distributed in the x-direction with substantially the same pitch as the former pitch. According to this, the branch conductors (8Ab, 8Bb) connected to one switching circuit (2) do not cross or pass near the power source input terminals of the other switching circuits (3, 4) and any influence such as induction of voltage to the switching circuit (2) by On/Off switching of the other switching circuits (3, 4) is greatly decreased. In the case of the three-phase inverter for the SR motor, the operation stability is further increased.

According to a third aspect of the present invention, the feeding conductor (8) includes bases (8Aa/8Ba) connected to the smoothing capacitors (5–7) and extends in the x-direction and the branch conductors (8Ab–8Ad/8Bb–8Bd) are branched from the bases (8Aa/8Ba) and extend in a y-direction.

According to a fourth aspect of the present invention, the smoothing capacitors (5–7) are distributed in the x-direction and are connected to the bases (8Aa/8Ba). The respective capacitors are disposed near the respective switching circuits in a one-to-one correspondence with the switching circuits (2–4), so that influence such as induction of voltage in the switching circuit (2) by On/Off switching of the other switching circuits (3,4) is greatly decreased. In the case of the three-phase inverter for the SR motor, the operation stability is further increased.

According to a fifth aspect of the present invention, a constituent (8A) of the feeding conductor (8) for a power source positive connection and a constituent (8B) of the feeding conductor for a ground connection are distributed in such a manner that parts of them overlap with each other in a projection in the z-direction. As a result, the inductance of the branch conductors (8Ab–8Ad/8Bb–8Bd) connected to the switching circuits (2–4) is lowered and, by the use of this together with the above-mentioned fourth aspect, the snubber circuit can only be a film capacitor and can be simplified.

According to a sixth aspect of the present invention, a switching assembly comprises three switching circuit units (2–4) distributed with an equal pitch in the x-direction on a substrate (1) having an x-y plane for feeding current to each of three electric coils (Ph1–Ph3);

a plurality of smoothing capacitors (5–7) distributed with an equal pitch in the x-direction on the substrate (1) in parallel to the switching circuit units (2–4);

a current supply conductor (8A) including a base (8Aa) which is connected to a power source positive terminal of the plurality of smoothing capacitors (5–7) and extends in the x-direction, and three branches (8Ab–8Ad) which are branched from the base, extend in a y-direction, and are connected to a power source positive terminal (C1) of the respective switching circuit units (2–4); and a ground conductor (8B) including a base (8Ba) which is connected to a ground connection terminal of the plurality of smoothing capacitors (5–7), extends in the x-direction, and is parallel to and positioned over the base (8Aa) of the positive current supply conductor (8A), and three branches (8Bb–8Bd) which are branched from the base (8Ba), extend in the y-direction, are parallel to and positioned over the branches (8Ab–8Ad) of the plus side feeding conductor (8A), and are connected to a ground connection terminal (E2) of the respective switching circuit units (2–4).

According to this sixth aspect of the invention, the same function and effect as the fifth aspect of the invention can be obtained. This sixth aspect of the invention is suitable as a three-phase inverter for an SR motor, and the operation stability of the inverter is high.

Other objects and features of the present invention will be clarified through the description of embodiments described below with reference to the drawings.

BRIEF DESCRIPTION OF THE DRAWINGS

FIG. 1(*a*) is a plan view showing an embodiment of the present invention.

FIG. 1(*b*) is a right side view showing the embodiment of FIG. 1(*a*).

FIG. 2(*b*) is a right side view showing the switching unit of FIG. 2(*a*).

FIG. 2(*c*) is a back view showing the switching unit of FIG. 2(*a*).

DETAILED DESCRIPTION OF THE INVENTION

FIGS. 1(*a*) and 1(*b*) show an embodiment of the present invention. FIG. 1(*a*) is a plan view and FIG. 1(*b*) is a right side view. Switching units 2, 3 and 4 are arranged with an equal pitch in the x-direction and are fixed on a substrate 1 inside which a cooling flow path for cooling water is formed so as to be continuous with a screw hole 14 for a water pipe connection and a screw hole 15 for a drainpipe connection. Double circles in FIG. 1(*a*) denote holes for the passage of fixing screws. Nuts are inserted into these holes and the screws are screwed into the nuts and the substrate 1.

Figure 3:
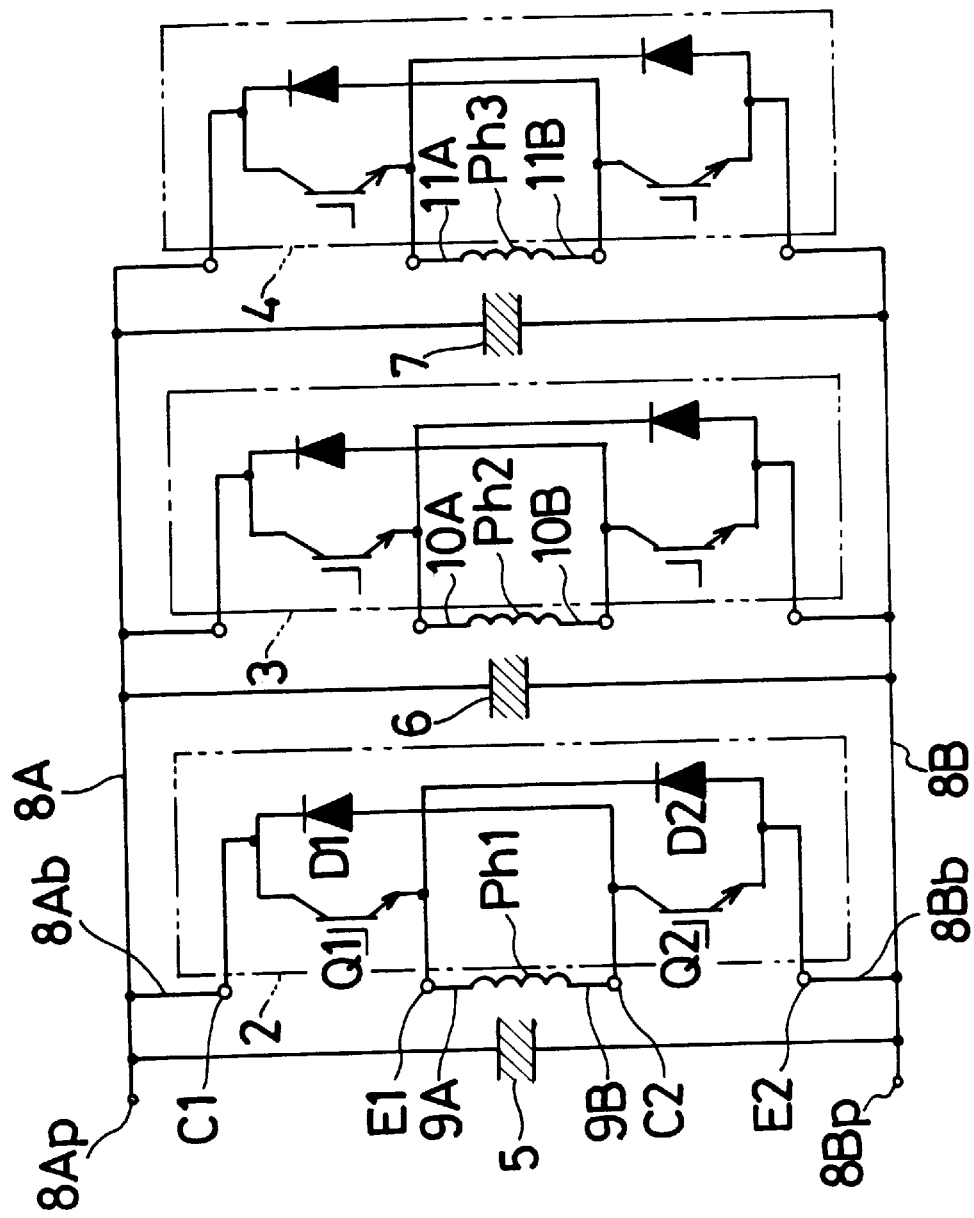
FIG. 3 is an electric circuit diagram showing an electric circuit structure of the switching assembly shown in FIG. 1(*a*).

FIG. 3 shows an electric circuit inside the switching units 2 to 4. The switching unit 2 includes switching transistors (IGBT) Q1, Q2 and diodes D1, D2 to which an electric coil Ph1 of a first phase of an SR motor (not shown) is connected, as shown in FIG. 3.

Figure 2C:
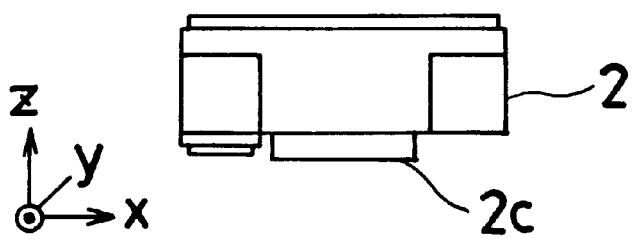
FIG. 2(*a*) is an enlarged plan view showing a switching unit 2 shown in FIGS. 1(*a*) and 1(*b*).
Figure 2A:
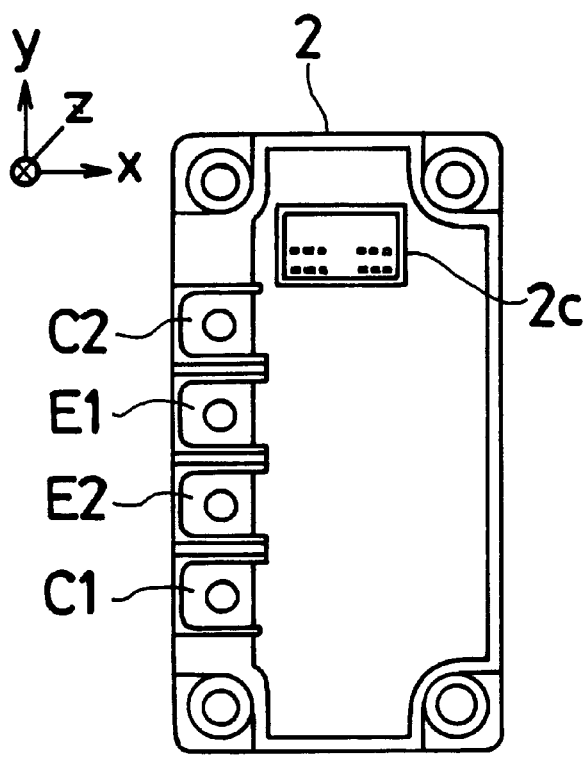
Figure 2B:
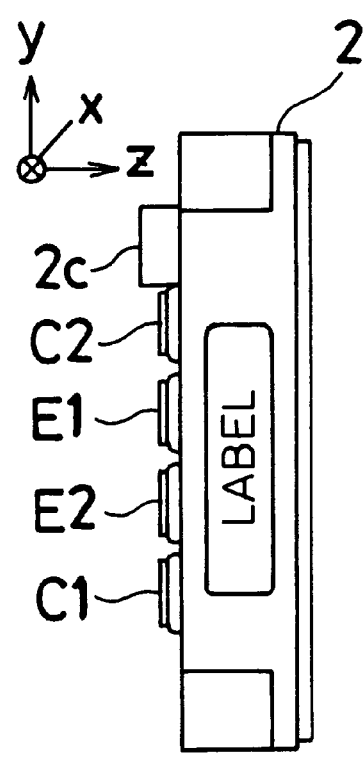

FIGS. 2(*a*) to 2(*c*) are enlarged views of the switching unit 2 shown in FIG. 1(*a*). FIG. 2(*a*) is a plan view, FIG. 2(*b*) is a right side view, and FIG. 2(*c*) is a back view. Coil connection terminals E1 and C2 for connection of electric coil Ph1 and electricity receiving terminals C1 and E2 are exposed on the upper surface of an insulating casing of the switching unit 2. A control signal connector 2*c* protrudes from the upper surface. The other switching units 3 and 4 also have the same structure as the unit 2, and electric coils Ph2 and Ph3 of second phase and third phase of the SR motor are connected to them (FIG. 3).

As shown in FIGS. 1(*a*) and 1(*b*), a capacitor case 13 having three smoothing capacitors 5 to 7 mounted thereon is fixed to the substrate 1. The three smoothing capacitors 5 to 7 are also arranged with an equal pitch in the x-direction and the center position of the center capacitor 6 in the x-direction is the same as the center position of the center switching unit 3 in the x-direction.

A feeding bus bar 8 is roughly a flat bar comprised of a pair of thin metal plates 8A and 8B of good conductor material and an insulator sheet interposed between them which are united with each other. The front surface thin metal plate 8B is for a ground (negative) connection and the rear surface thin metal plate 8A is for power source (positive) connection. The respective thin metal plates 8A and 8B of the feeding bus bar 8 include wide bases 8Aa and 8Ba extending in the x-direction for connection with the three smoothing capacitors 5 to 7, three branches (8Ab/8Bb), (8Ac/8Bc), and (8Ad/8Bd) protruding in the y-direction from the bases and bending in the x-direction to reach the electricity receiving terminals C1 and E2 of the switching units 2 to 4 and power source terminals 8Ap and 8Bp for connection to power source lines (not shown). The three branches (8Ab/8Bb), (8Ac/8Bc), and (8Ad/8Bd) are distributed in the x-direction at the same pitch as the arranging pitch of the switching units 2 to 4 in the x-direction.

The power source (positive) terminal 8Ap of the rear surface thin metal plate 8A is relatively shifted from the GND (negative) power source terminal 8Bp of the front surface thin metal plate 8B in the x-direction, and tip portions of the respective branches (8Ab/8Bb), (8Ac/8Bc), and (8Ad/8Bd) are shifted in the y-direction between those of the rear surface thin metal plate BA and those of the front surface thin metal plate 8B. When the thin metal plates are projected in the z-direction, the foregoing insulator sheet exists in the region where the rear surface thin metal plate 8A overlaps the front surface thin metal plate 8B.

The power source (positive) terminal 8Ap of the rear surface thin metal plate 8A and the GND (negative) power source terminal 8Bp of the front surface thin metal plate 8B are put on the upper end surfaces of screw receiving stems of the capacitor case 13. These stems are provided with screw holes for fixing power source lead lines. The positive line of the not-shown power source line and the GND line are respectively put on the terminals 8Ap and 8Bp, they are pressed by screws, and the screws are screwed into the stems, so that the power source line is connected to the feeding bus bar 8, and at the same time, the base 8Aa of the rear surface thin metal plate 8A is pressed against the plus terminals of the capacitors 5 to 7. That is, the feeding bus bar 8 is connected to the capacitors 5 to 7.

The first branches 8Ab and 8Bb are connected to the electricity receiving terminals C1 and E2 of the switching unit 2 by passing respective screws (not shown) through the holes of the tip ends of the branches 8Ab and 8Bb and the holes of the electricity receiving terminals C1 and E2 and by screwing them into the holes of the insulating case of the unit 2. Similarly, the second branches 8Ac and 8Bc are connected to the electricity receiving terminals C1 and E2 of the switching unit 3, and the third branches 8Ad and 8Bd are respectively connected to the electricity receiving terminals C1 and E2 of the switching unit 4. Upon making these connections, a pulling force is applied to the bases 8Ba and 8Aa causing them to approach the substrate 1 which strengthens the press contact of the base 8Aa to the plus terminals of the capacitors 5 to 7 to provide a better electrical connection.

An electric coil feeding bar 9 is generally a flat bar, like the feeding bus bar 8, in which a pair of thin metal plates 9A and 9B of good conductive material and an insulator sheet inserted between them are united with each other. The front surface thin metal plate 9B is connected to a feeding terminal C2 of the switching unit 2, and the rear surface thin metal plate 9A is connected to a feeding terminal E1. The electric coil Ph1 is connected to the upper end of the feeding bar 9 standing in the z-direction. Electric coil feeding bars 10 and 11 have the same structure as the feeding bar 9, are respectively connected to the switching units 3 and 4 and the electric coils Ph2 and Ph3 are connected to the upper ends of them.

A circuit substrate 12 provided with a switching control circuit (not shown) including a switching driver stands on the substrate 1. Gate control signal lines of the switching control circuit are connected to connectors 2c to 4c on the switching units 2 to 4 through control signal lines (not shown) and connectors at the signal line side, and are connected to the bases of the switching transistors (Q1, Q2) in the units 2 to 4.

The electric circuit structure of the foregoing switching assembly is as shown in FIG. 3. A positive potential of direct current power source (not shown) is applied to the terminal 8Ap, and a negative (GND) potential is applied to the terminal 8Bp. In the respective combinations (5,2), (6,3), (7,4) of the smoothing capacitors 5 to 7 and the switching units 2 to 4, the relative positional relation between the capacitors and the switching units are almost the same, the shapes of the branches (8Ab/8Bb), (8Ac/8Bc), and (8Ad/8Bd) are the same, and the relative positions between the branches and the switching units 2, 3 and 4 connected with them are substantially the same. Thus, the values of inductance of the feeding conductors between the respective smoothing capacitors 5 to 7 and the respective switching circuits 2 to 4 are substantially the same or very approximate to each other. That is, in the case where the switching assembly of the present invention was used as the three-phase inverter for driving an SR motor, variation in inductance due to the respective phases was capable of being eliminated. Then the smoothing capacitors were capable of being disposed between the phase to be fed and the other phase (FIG. 3), and as a result, variation of voltage due to the influence of feeding to the motor coil of the other phase was capable of being made minimum.

Since the feeding bus bar 8 was made the as a laminated structure, the lowering effect of inductance due to the lamination was further added, so that the snubber circuit was capable of being made only as a film capacitor and was capable of being simplified.

While the preferred embodiments have been described, variations thereto will occur to those skilled in the art within the scope of the present inventive concepts which are delineated by the following claims.

What is claimed is:

1. A switching assembly, comprising:

smoothing capacitors connected to a power source in parallel;

a plurality of switching circuits for feeding current to each of a plurality of electric coils; and a feeding conductor connected to the smoothing capacitors and including a plurality of branch conductors circuits said branch conductors connected to each of the switching circuits and substantially having the same wiring shape and wiring length relative to each other.

2. The switching assembly as claimed in claim 1, wherein the switching circuits are distributed with an equal pitch in an x-direction and the branch conductors are distributed with substantially the same pitch as the switching circuit pitch in the x-direction.

3. The switching assembly as claimed in claim 1, wherein the feeding conductor includes a base connected to the smoothing capacitors and extending in the x-direction, and the branch conductors are branched from the base and extend in a y-direction.

4. The switching assembly as claimed in claim 3, wherein the smoothing capacitors are distributed in the x-direction and are respectively a plurality of capacitors mounted on the base.

5. The switching assembly as claimed in claim 3, wherein a component of the feeding conductor for connection to a positive power source and a component of the feeding conductor for a ground connection are disposed in partial overlapping relation with each other in a z-direction.

6. A switching assembly, comprising:

three switching circuit units distributed with an equal pitch in an x-direction on a substrate having a x-y plane and for feeding current to each of three electric coils;

a plurality of smoothing capacitors distributed with an equal pitch on the substrate in the x-direction in parallel to the switching circuit units;

a positive side feeding conductor includes a base adapted to be connected to a power source positive connection terminal of the plurality of smoothing capacitors and which extends in the x-direction and three branches which extend from the base in a y-direction and are connected to a positive power connection terminal of the respective switching circuit units; and a ground feeding conductor includes a base which is connected to a ground connection terminal of the plurality of smoothing capacitors and extends in the x-direction, said ground feeding conductor being parallel to and positioned over the base of the positive feeding conductor and three branches which are branched from the base in the y-direction which are parallel to and positioned over the branches of the positive feeding conductor and are connected to a ground connection terminal of the respective switching circuit units.

* * * * *